(12) United States Patent
Kumagai et al.

(10) Patent No.: US 7,416,209 B2
(45) Date of Patent: Aug. 26, 2008

(54) AIRBAG APPARATUS

(75) Inventors: Masayoshi Kumagai, Minato-ku (JP); Kazuhiro Abe, Minato-ku (JP)

(73) Assignee: Takata Corporation, Tokyo (JP)

( * ) Notice: Subject to any disclaimer, the term of this patent is extended or adjusted under 35 U.S.C. 154(b) by 491 days.

(21) Appl. No.: 11/314,533

(22) Filed: Dec. 22, 2005

(65) Prior Publication Data

US 2006/0138753 A1    Jun. 29, 2006

(30) Foreign Application Priority Data

Dec. 28, 2004    (JP)    ............................. 2004-379928

(51) Int. Cl.
    *B60R 21/233*    (2006.01)
(52) U.S. Cl. .................... 280/729; 280/728.2; 280/731
(58) Field of Classification Search .............. 280/728.2, 280/729, 731
    See application file for complete search history.

(56) References Cited

U.S. PATENT DOCUMENTS

| | | | | |
|---|---|---|---|---|
| 4,852,907 | A | * | 8/1989 | Shiraki et al. ................ 280/731 |
| 4,877,264 | A | * | 10/1989 | Cuevas ........................ 280/731 |
| 4,913,461 | A | * | 4/1990 | Cuevas ........................ 280/731 |
| 5,044,663 | A | * | 9/1991 | Seizert ..................... 280/730.1 |
| RE33,938 | E | * | 5/1992 | Cuevas ........................ 280/731 |
| 5,240,283 | A | * | 8/1993 | Kishi et al. .................. 280/729 |
| 5,480,184 | A | * | 1/1996 | Young ......................... 280/731 |
| 5,529,337 | A | * | 6/1996 | Takeda et al. ................ 280/729 |
| 6,254,121 | B1 | * | 7/2001 | Fowler et al. ................ 280/729 |
| 6,382,662 | B1 | | 5/2002 | Igawa |
| 6,471,244 | B1 | | 10/2002 | Nishijima et al. |
| 6,626,459 | B2 | * | 9/2003 | Takimoto et al. ............. 280/731 |
| 6,827,368 | B2 | * | 12/2004 | Jang et al. ................... 280/729 |
| 7,040,655 | B2 | * | 5/2006 | Igawa et al. ................. 280/739 |
| 7,111,866 | B2 | * | 9/2006 | Abe et al. .................... 280/729 |
| 7,334,812 | B2 | * | 2/2008 | Abe ........................... 280/729 |
| 2001/0052689 | A1 | * | 12/2001 | Adomeit et al. ........... 280/728.2 |
| 2002/0067032 | A1 | * | 6/2002 | Ishikawa .................. 280/743.1 |
| 2004/0135352 | A1 | * | 7/2004 | Igawa et al. ................. 280/729 |
| 2004/0145162 | A1 | * | 7/2004 | Abe et al. .................... 280/729 |

FOREIGN PATENT DOCUMENTS

| | | |
|---|---|---|
| EP | 0 483 366 | 5/1992 |
| EP | 1 442 944 | 8/2004 |
| EP | 1 574 403 | 9/2005 |
| JP | 01311930 A | 12/1989 |

* cited by examiner

*Primary Examiner*—Kevin Hurley
*Assistant Examiner*—Barry Gooden, Jr.
(74) *Attorney, Agent, or Firm*—Manabu Kanesaka

(57) ABSTRACT

An airbag apparatus includes an airbag, a gas generator, a retainer to which the airbag and the gas generator are attached, and a module cover for covering the folded airbag. The airbag has a front panel, a rear panel, and an inner panel for partitioning the airbag interior into a first chamber and a second chamber. The inner panel has communication ports for communication of inflation gas between the first chamber and the second chamber. In an inflated state, at least a portion of the communication ports is disposed in a section of the inner panel below an upper end of a leg portion of the module cover. Gas discharged from gas discharge ports is supplied to the second chamber via the communication ports. Inflation of the second chamber, therefore, is accomplished in an early stage of airbag deployment.

8 Claims, 3 Drawing Sheets

AIRBAG APPARATUS

BACKGROUND OF THE INVENTION AND RELATED ART STATEMENT

The present invention relates to an airbag apparatus provided on a high-velocity moving body, such as a vehicle, for inflating an airbag in case of an emergency such as a collision, and for protecting a human body.

In order to protect a passenger in case of an emergency such as the collision of a motor vehicle, various types of airbag apparatus such as an airbag apparatus for a driver's seat are used. The airbag apparatus for a driver's seat includes an airbag formed by stitching peripheral edges of a front panel on the passenger's side and a rear panel on the opposite side. An inflator port for receiving a distal side of an inflator is provided at a center of the rear panel. The peripheral portion of this port is mounted to a retainer by bolts, pins, rivets or the like. The rear panel is provided with a vent hole for releasing gas in the bag and absorbing an impact when the passenger seated on the driver's seat strikes against the airbag.

In Japanese Unexamined Patent Application Publication No. 1-311930, an airbag provided with an inner panel (referred to as "inner air bag" in the aforementioned reference) so as to extend between the inflator port on the rear panel and the front panel. An interior of the airbag is partitioned into a first chamber at a center and a second chamber around the first chamber. The inner air bag is provided with a communication port for bringing the first chamber and the second chamber into communication. When the inflator is activated, the first chamber is inflated first, and the second chamber is inflated subsequently.

It is an object of the present invention, in an airbag having an interior partitioned into a first chamber and a second chamber, to enable inflation of the second chamber to be accomplished in the early stage of the airbag deployment.

Further objects and advantages of the invention will be apparent from the following description of the invention and the associated drawings.

SUMMARY OF THE INVENTION

An airbag apparatus according to a first embodiment of the present invention includes an airbag; a gas generator; a retainer to which the airbag and the gas generator are attached; and a module cover mounted to the retainer for covering the folded airbag.

The airbag includes a front panel to be disposed on a side of a passenger; a rear panel to be disposed on an opposite side from the passenger, the front panel and the rear panel being connected at peripheral edge portions thereof; an inner panel for partitioning an interior of the airbag into a first chamber at a center and a second chamber which surrounds the first chamber; and gas generator insertion ports formed on the rear panel and the inner panel.

The module cover includes a leg portion mounted at a proximal side to the retainer and extended toward the passenger side along a side of the airbag, and a top lid portion continuing from an upper end of the leg portion for covering the passenger side of the airbag.

The inner panel is provided with communication ports for bringing the first chamber and the second chamber into communication. At least a part of the communication ports is disposed on a side below the upper end of the leg portion of the module cover in a state in which the airbag is inflated.

An airbag apparatus according to a second embodiment of the present invention includes an airbag; a gas generator; a retainer to which the airbag and the gas generator are attached; and a module cover mounted to the retainer for covering the folded airbag.

The airbag includes a front panel to be disposed on a side of a passenger; a rear panel to be disposed on an opposite side from the passenger, the front panel and the rear panel being connected at peripheral edge portions thereof; an inner panel for partitioning an interior of the airbag into a first chamber at a center and a second chamber which surrounds the first chamber; and gas generator insertion ports formed on the rear panel and the inner panel.

The retainer includes a main plate portion opposing the passenger, and an upright strip rising upright from a side edge of the main plate portion toward the passenger.

The module cover includes a leg portion mounted at a proximal side to the upright strip of the retainer and extended toward the passenger side along a side of the airbag, and a top lid portion continuing from an upper end of the leg portion for covering the passenger side of the airbag.

The inner panel is provided with communication ports for bringing the first chamber and the second chamber into communication. At least a part of the communication ports is disposed on a side below an upper end of the upright strip in a state in which the airbag is inflated.

In the airbag apparatus according to the present invention, the communication ports for bringing the first chamber and the second chamber into communication in the airbag are disposed on the proximal side with respect to the upper end of the leg portion of the module cover (first embodiment), or on the proximal side with respect to the upper end of the upright strip of the retainer (second embodiment). With each embodiment of the invention, gas in the first chamber is quickly supplied to the second chamber, and hence the second chamber is inflated in an early stage of air bag deployment.

DETAILED DESCRIPTION OF THE PREFERRED EMBODIMENTS

Figure 1:
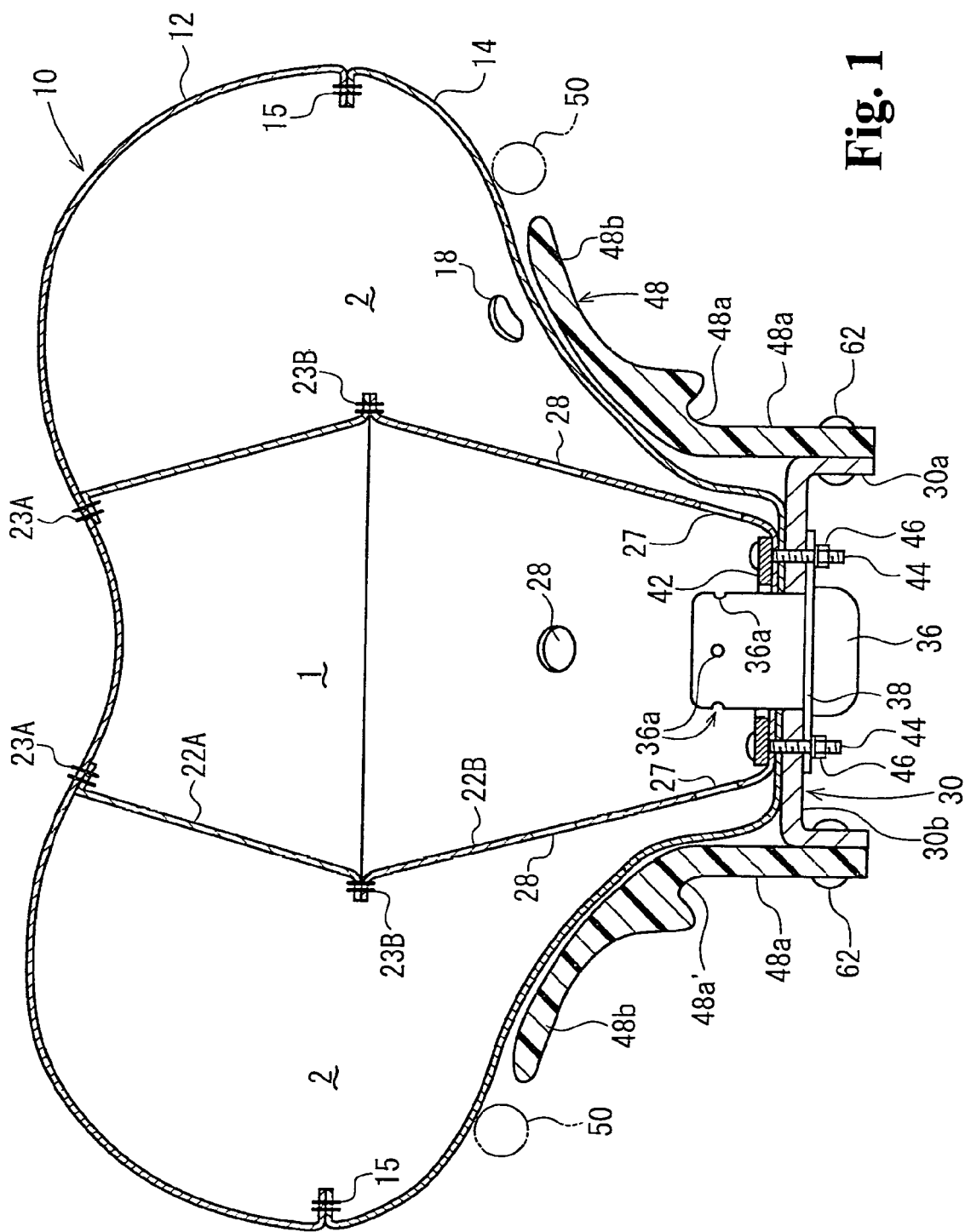
FIG. 1 is a cross-sectional view of an airbag apparatus according to a first embodiment of the invention.

Referring now to the drawings, embodiments of the present invention will be described.

Figure 2:
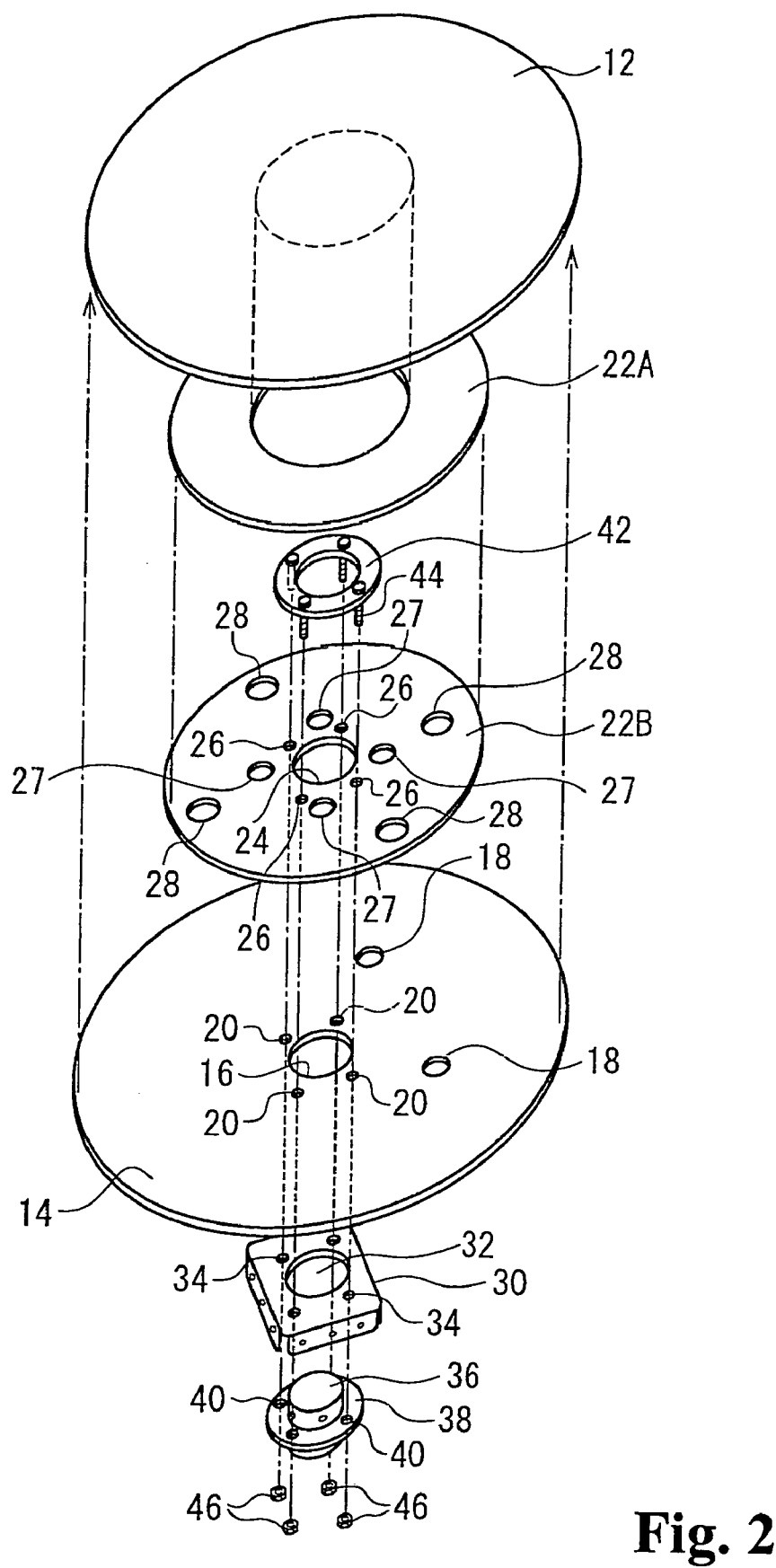
FIG. 2 is an exploded perspective view of the airbag apparatus depicted in FIG. 1.

FIG. 1 is a cross-sectional view of an airbag for the driver's seat of a vehicle and an airbag apparatus according to a first embodiment of the present invention. FIG. 2 is an exploded perspective view of the airbag and the airbag apparatus depicted in FIG. 1.

An airbag 10 includes a front panel 12, a rear panel 14, a first inner panel 22A, and a second inner panel 22B, which are formed of a circular woven cloth respectively. The front panel 12 and the rear panel 14 have the same diameter, and are formed into a bag shape by being stitched together at outer peripheral edge portions thereof by a seam 15 of yarn or the like. The stitched portion has an annular shape formed around the outer peripheries of the front panel 12 and the rear panel 14.

The rear panel 14 is provided with an inflator (gas generator) port 16 and a vent hole 18. The inflator port 16 is arranged at a center of the rear panel 14. Provided around the inflator port 16 are bolt insertion holes 20.

The first inner panel 22A and the second inner panel 22B are provided inside the airbag 10. The first and second inner panels 22A, 22B are disposed substantially concentrically with the front panel 12 and the rear panel 14, and outer peripheral edge portions thereof are stitched together by a seam 23B of yarn or the like. An inner peripheral edge of the first inner panel 22A on the side of the front panel 12 (a peripheral edge of the inner panel 22A on the distal side in a state in which the airbag 10 is inflated) is stitched with an intermediate portion between the center portion and the peripheral portion of the front panel 12 by a seam 23A of yarn or the like.

An inflator insertion port 24, which is disposed substantially concentrically with the inflator port 16 on the rear panel 14, is provided at a center portion of the second inner panel 22B on the side of the rear panel 14 (a portion on the rear end of the second inner panel 22B in a state in which the airbag 10 is inflated). These ports 16, 24 have substantially the same diameter. Provided around the port 24 on the inner panel 22B are bolt insertion holes 26 which are aligned with the bolt insertion holes 20 on the rear panel 14.

Communication ports 28 are provided on the second inner panel 22B at positions relatively close to the outer peripheral edge thereof, and communication ports 27 are provided on the inner peripheral side thereof. The communication ports 28 may be provided on the first inner panel 22A.

A peripheral edge portion of the inflator port 24 on the second inner panel 22B is aligned with a peripheral edge portion of the inflator port 16 on the rear panel 14, and then aligned with a peripheral edge portion of an inflator mounting port 32 of a retainer 30. Then, the peripheral edge portions of the inflator ports 24, 16 are fixed to the retainer 30 through the bolt insertion holes 26, 20. Accordingly, the peripheral edge portion of the inflator port 24 on the second inner panel 22B is connected to the peripheral edge portion of the inflator port 16 on the rear panel 14, the outer peripheral edge portions of the first and second inner panels 22A, 22B are connected together, and the inner peripheral edge portion of the first inner panel 22A is connected to the front panel 12.

The first and second inner panels 22A, 22B partition an interior of the airbag 10 into a first chamber 1 at a center and a second chamber 2 which surrounds the first chamber 1. The first chamber 1 is positioned inside the inner panels 22A, 22B.

The communication ports 27 are positioned in a range of 35 to 150 mm in diameter, preferably in a range of 40 to 130 mm and, more preferably in a range of 50 to 100 mm from a center of the port 24 in a state in which the rear panel 14 and the second inner panel 22B are flatly spread.

In this embodiment, the communication ports 27 are formed at positions on extensions of the gas discharging directions of an inflator 36, described later, disposed in the first chamber 1 via the inflator ports 16, 24, that is, at positions opposing gas discharge ports 36a of the inflator 36.

In this embodiment, as shown in FIG. 2, the communication ports 27 and the communication ports 28 are formed at regular intervals circumferentially of the airbag at four positions each. The communication ports 27 are shifted from the communication ports 28 in circumferential phase about a center of the airbag.

It is also applicable to attach reinforcing patches or the like at the peripheral edge portions of the ports 16, 24, the communication ports 27, 28 and/or the vent holes 18.

The retainer 30 for mounting the airbag 10 includes a main plate portion 30b opposing to a passenger and a trailing strip 30a which extends from a side edge of the main plate portion 30b downward in the direction away from the passenger. The main plate portion 30b is provided with the inflator mounting port 32 at a center thereof, and bolt insertion holes 34 around the same.

The inflator 36 has a substantially columnar shape, and is provided with the gas discharge ports 36a on a side peripheral surface on a distal side in a direction of a cylinder axis. In this embodiment, the gas discharge ports 36a are provided at regular intervals circumferentially of the inflator 36 at four positions. The inflator 36 is adapted to discharge gas from the gas discharge ports 36a in the discharging directions.

A flange 38 for fixing the inflator is formed so as to project from the side peripheral surface at a midsection (rear side from the gas discharge ports 36a) of the inflator 36 in the direction of cylinder axis. The flange 38 is provided with bolt insertion holes 40. The inflator 36 is fitted to the inflator mounting port 32 of the retainer 30 at a distal side thereof.

When mounting the airbag 10 to the retainer 30, the peripheral edge portions of the inflator ports 16, 24 of the rear panel 14 and the second inner panel 22B are pressed against the peripheral edge portion of the inflator mounting port 32 of the retainer 30 by a holding ring 42. A distal side of the inflator 36 fitted to the inflator mounting port 32 is inserted into the first chamber 1 via the inflator ports 16, 24. The gas discharge ports 36a provided at the distal side of the inflator 36 oppose the communication ports 27 of the second inner panel 22B, respectively.

In this case, the second inner panel 22B, the airbag 10, and the inflator 36 are fixed to the retainer 30 by inserting stud bolts 44 of the holding ring 42 through the bolt insertion ports 26, 20, 34, 40 and tightening nuts 46 at the distal ends thereof. Then, the airbag 10 is folded and a module cover 48 is mounted to the retainer 30 so as to cover the folded body of the airbag 10.

The module cover 48 includes a leg portion 48a of a frame shape for surrounding four side surfaces of the folded body of the airbag, and a top lid portion 48b continuing from an upper end 48a' of the leg portion 48a for covering the passenger side of the folded body of the airbag.

When mounting the module cover 48, the module cover 48 is covered on the folded body of the airbag 10 and causes the leg portion 48a to lie from the side surface of the folded body of the airbag 10 along the trailing strip 30a of the retainer 30. Subsequently, the leg portion 48a and the trailing strip 30a are connected by a connecting member such as a rivet 62 or the like.

The airbag apparatus is configured by mounting the module cover 48 in this manner. The airbag apparatus is installed inside a steering wheel 50 of a motor vehicle.

Upon collision of the vehicle, the inflator 36 is activated and gas is discharged into the airbag 10. The airbag 10, being inflated by the gas, presses and opens the top lid portion 48b of the module cover 48, and is deployed into a cabin of the vehicle to protect the passenger in the driver's seat.

In the case of the airbag 10, as shown in FIG. 1, since the communication ports 27 which bring the first chamber 1 and the second chamber 2 into communication are positioned on the side (the retainer 30 side) below the upper end 48a' of the module cover leg portion 48a in a state in which the airbag 10 is inflated, the discharged gas from the inflator 36 is introduced quickly into the second chamber 2, whereby the second chamber 2 inflates in an early stage of airbag inflation.

In particular, according to the present embodiment, the communication ports 27 are positioned on the extensions of the gas discharging directions of the inflator 36 as shown in FIG. 1, the gas from the inflator 36 is directly discharged toward the portion near the communication ports 27 and then is flowed into the second chamber 2 from the communication ports 27. Therefore, since the discharged gas from the inflator 36 is flowed directly into the second chamber 2, the second chamber 2 is inflated quickly in an early stage of air bag deployment.

When the passenger strikes against the inflated airbag 10, the gas in the first chamber 1 and the second chamber 2 flows out through the communication ports 28 or the vent hole 18, whereby an impact is absorbed.

Figure 3:
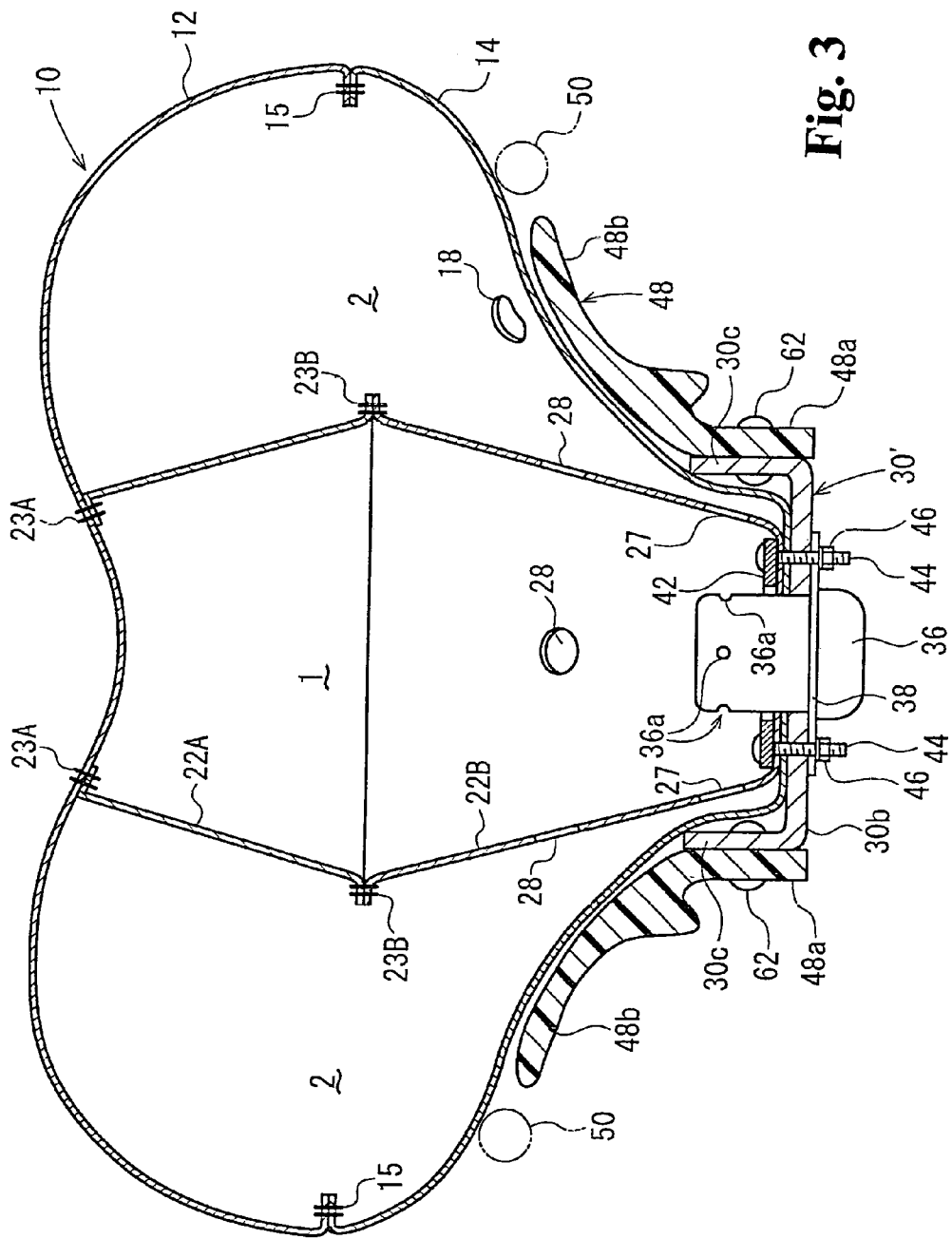
FIG. 3 is a cross-sectional view of an airbag apparatus according to a second embodiment of the invention.

FIG. 3 is a vertical cross-sectional view of an airbag apparatus according to a second embodiment of the invention.

In this embodiment, a retainer 30' having the main plate portion 30b and an upright strip 30c which rises upright from the main plate portion 30b toward the passenger side is used as the retainer. The leg portion 48a of the module cover 48 is overlapped on an outer surface of the upright strip 30c and connected by the connecting member such as the rivet 62.

The communication ports 27 of the second inner panel 22B are positioned on the side (on the side of the main plate portion 30b) below an upper end of the upright strip 30c in a state in which the airbag 10 is inflated.

Other structures of this embodiment are the same as the previous embodiment, and hence the same reference numerals represent the same parts.

In the case of the airbag apparatus shown in FIG. 3 as well, since the communication ports 27 are located at lower positions with respect to the upper end of the upright strip 30c in a state in which the inflator 36 is activated and the airbag 10 is inflated, discharged gas from the inflator 36 is quickly introduced to the second chamber 2 via the communication ports 27, whereby the second chamber 2 is inflated in an early stage of air bag deployment.

The respective embodiments are only examples of the present invention, and hence the present invention is not necessarily limited to those embodiments. For example, although four each of the gas discharge ports 36a and the communication ports 27 are provided in the above-described embodiments, the numbers of those are not limited to four. Although the communication ports 27 are arranged on the extensions in the gas discharging directions of all the gas discharge ports 36a of the inflator 36, the communication ports 27 may be arranged only on the directions of extensions of part of the gas discharge ports 36a. Alternatively, the part of the communication ports may be arranged at positions shifted from the directions of extensions of the gas discharge ports 36a, and there may exist a communication port which does not oppose the gas discharge port 36a.

In the present invention, a rectifier cloth for guiding gas from the inflator to the communication ports 27 may be provided in the first chamber 1.

Although the communication ports 28 are provided on the second inner panel 22B in the above-described embodiment, the communication ports 28 may be provided on the first inner panel 22A. The communication ports 28 may also be provided both on the first inner panel 22A and the second inner panel 22B. The communication ports 28 may be arranged at positions corresponding to the positions of the communication ports 27.

Although the above-described embodiments are examples in which the present invention is applied to the airbag for the driver's seat or the airbag apparatus for the driver's seat, the present invention may be applied to an airbag and airbag apparatus of other various applications.

The disclosure of Japanese Patent Application No. 2004-379928 filed on Dec. 28, 2004, is incorporated herein.

What is claimed is:

1. An airbag apparatus comprising:
    an airbag including an inner panel for partitioning an interior of said airbag into a first chamber at a center thereof and a second chamber surrounding said first chamber, said inner panel having a plurality of communication ports for communication between said first chamber and said second chamber,
    a gas generator for inflating the airbag,
    a retainer to which said airbag and said gas generator are attached, and
    a module cover mounted to said retainer for covering said airbag in a folded state, and comprising a leg portion mounted to a proximal side of said retainer and extended along a side of said airbag, and a top lid portion, continuing from an upper end of said leg portion, for covering said airbag,
    wherein said plurality of communication ports in the inner panel is arranged such that in an airbag fully inflated state, at least a portion of said plurality of communication ports is disposed at a side below said upper end of said leg portion.

2. An airbag apparatus according to claim 1, wherein said airbag further comprises a front panel disposed on a first side of said airbag, and a rear panel disposed on a second side of said airbag, said front panel and said rear panel being connected at peripheral edge portions thereof, said rear panel and said inner panel having gas generator insertion ports.

3. An airbag apparatus according to claim 1, wherein said gas generator comprises a plurality of gas discharge ports, in said inflated state, each of said communication ports being disposed at a position corresponding to a position of each of said gas discharge ports.

4. An airbag apparatus according to claim 1, wherein said inner panel comprises a first inner panel and a second inner panel, all of said communication ports being disposed in said second inner panel.

5. An airbag apparatus according to claim 4, wherein, in an airbag uninflated state in which said rear panel and said second inner panel are flatly spread, said communication ports are positioned in a range from 35 to 150 mm in diameter from a center of said second inner panel gas generator insertion port.

6. An airbag apparatus according to claim 5, wherein said range is from 50 to 100 mm.

7. An airbag apparatus according to claim 1, wherein said communication ports communicate inflation gas from said first chamber to said second chamber so that said second chamber is inflated in an early stage of an airbag deployment.

8. An airbag apparatus comprising:
    an airbag, a gas generator, a retainer to which said airbag and said gas generator are attached, and a module cover mounted to said retainer for covering said airbag in a folded state, said airbag comprising
    a front panel disposed on a first side of said airbag;
    a rear panel disposed on a second side of said airbag, said front panel and said rear panel being connected at peripheral edge portions thereof;
    an inner panel for partitioning an interior of said airbag into a first chamber at a center thereof and a second chamber surrounding said first chamber, said inner panel having a plurality of communication ports for communication between said first chamber and said second chamber; and
    gas generator insertion ports in said rear panel and said inner panel, said retainer comprising a main plate portion opposing said airbag first side, and an upright strip rising toward said airbag first side from a side edge of said main plate portion;

said module cover comprising a leg portion mounted to a proximal side of said upright strip, and extended along a side of said airbag toward said airbag first side, and a top lid portion, continuing from an upper end of said leg portion, for covering said airbag first side, wherein, in an airbag fully inflated state, at least a portion of said plurality of communication ports is disposed in a section of said inner panel below said upper end of said upright strip.

\* \* \* \* \*